(12) United States Patent
Lin

(10) Patent No.: US 7,800,828 B2
(45) Date of Patent: Sep. 21, 2010

(54) WIDE-ANGLE LENS AND PROJECTION DEVICE USING THE SAME

(75) Inventor: Ming-Kuen Lin, Yunlin County (TW)

(73) Assignee: Quisda Corporation, Taoyuan County (TW)

( * ) Notice: Subject to any disclaimer, the term of this patent is extended or adjusted under 35 U.S.C. 154(b) by 0 days.

(21) Appl. No.: 12/314,536

(22) Filed: Dec. 12, 2008

(65) Prior Publication Data

US 2009/0153986 A1    Jun. 18, 2009

(30) Foreign Application Priority Data

Dec. 14, 2007    (TW) ............................... 96148036 A

(51) Int. Cl.
*G02B 9/00*    (2006.01)

(52) U.S. Cl. ...................................... 359/651; 359/649

(58) Field of Classification Search ......... 359/649–651, 359/784
See application file for complete search history.

(56) References Cited

U.S. PATENT DOCUMENTS 7,057,825 B2 *    6/2006    Kobayashi .................. 359/651

* cited by examiner

*Primary Examiner*—William C Choi

(57) ABSTRACT

A wide-angle lens and a projection device using the same are provided. The wide-angle lens from an image side sequentially comprises a first lens group, a second lens group and a third lens group. The third lens group comprises an aperture stop. The first lens group has a negative refracting power, the second lens group has a positive refracting power, and the third lens group has a positive refracting power. A focal length f1 of the first lens group and a focal length fw of the wide-angle lens satisfy the following conditions: $-15$ mm$<$f1$<-7.5$ mm, and $0.5<|f1/fw|<1.5$.

14 Claims, 5 Drawing Sheets

WIDE-ANGLE LENS AND PROJECTION DEVICE USING THE SAME

This application claims the benefit of Taiwan application Serial No. 96148036, filed Dec. 14, 2007, the subject matter of which is incorporated herein by reference.

BACKGROUND OF THE INVENTION

1. Field of the Invention

The invention relates in general to a wide-angle lens and a projection device using the same, and more particularly to a wide-angle lens having three lens groups and a projection device using the same.

2. Description of the Related Art

The projection distance of a projection device is related to the size of the to-be-displayed image. The farther away from the screen the projection device is, the larger the projected image will be. However, the projection distance is often restricted by the hardware and the space. Thus, how to project a large image with a limited projection distance has become a focus in the industry of projection device.

SUMMARY OF THE INVENTION

The invention is directed to a wide-angle lens and a projection device using the same. With the disposition of three lens groups, the projection device can display a large-sized image under a shorter projection distance.

According to a first aspect of the present invention, a wide-angle lens disposed in a projection device is provided. The wide-angle lens from an image side sequentially comprises a first lens group, a second lens group and a third lens group. The third lens group comprises an aperture stop. The first lens group has a negative refracting power, the second lens group has a positive refracting power, and the third lens group has a positive refracting power. A focal length f1 of the first lens group and a focal length fw of the wide-angle lens satisfy the following conditions: $-15 \text{ mm} < f1 < -7.5 \text{ mm}$, and $0.5 < |f1/fw| < 1.5$.

According to a second aspect of the present invention, a projection device comprising a wide-angle lens and an optical element is provided. The wide-angle lens from an image side sequentially comprises a first lens group, a second lens group and a third lens group. The third lens group comprises an aperture stop. The first lens group has a negative refracting power, and the second lens group has a positive refracting power. The third lens group has a positive refracting power. The wide-angle lens is located between the image and the optical element. A focal length f1 of the first lens group and a focal length fw of the wide-angle lens satisfy the following conditions: $-15 \text{ mm} < f1 < -7.5 \text{ mm}$, and $0.5 < |f1/fw| < 1.5$.

The invention will become apparent from the following detailed description of the preferred but non-limiting embodiments. The following description is made with reference to the accompanying drawings.

DETAILED DESCRIPTION OF THE INVENTION

First Embodiment

Figure 1:
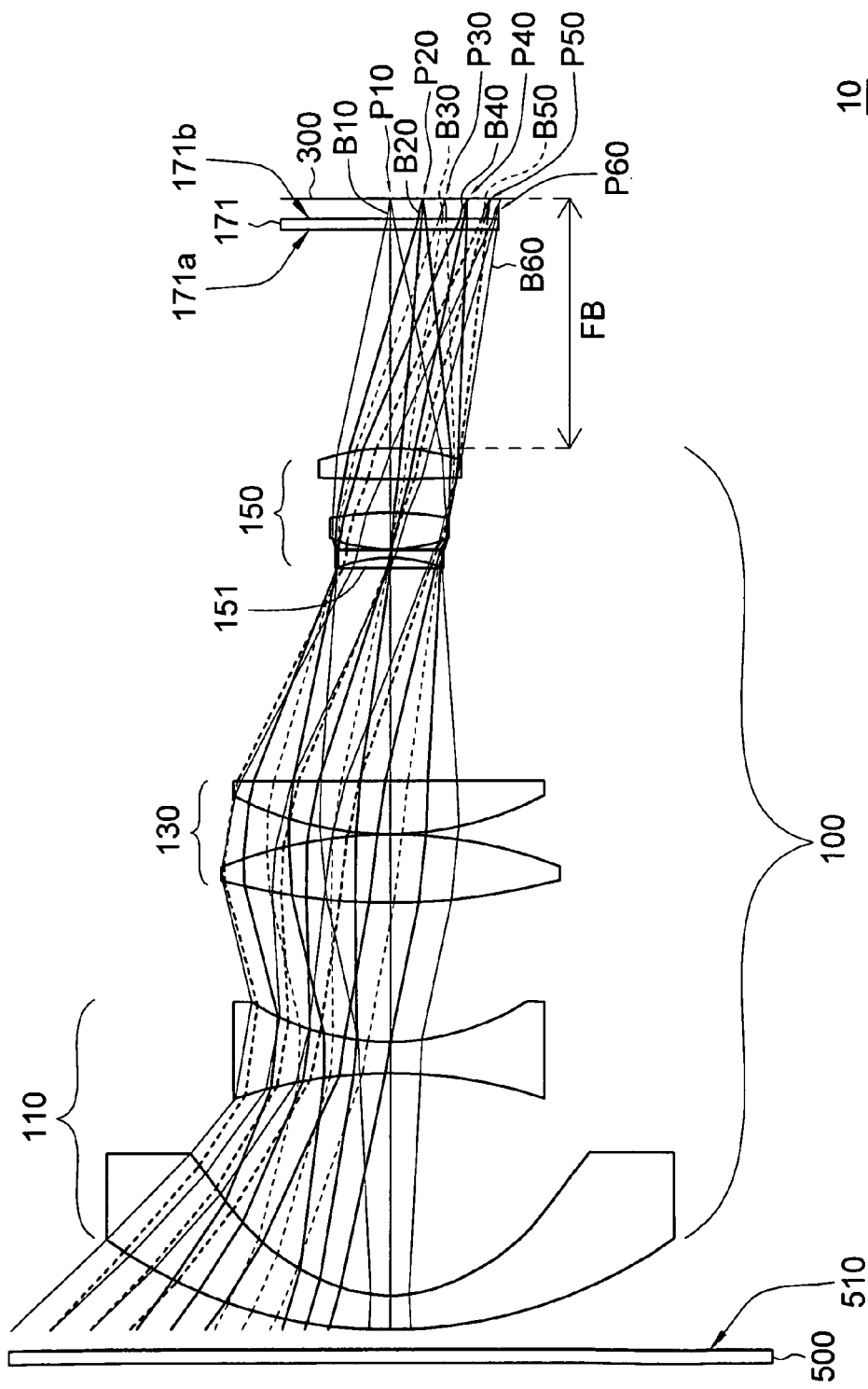
FIG. 1 shows a perspective of a projection device according to a first embodiment of the invention.

Referring to FIG. 1, a perspective of a projection device according to a first embodiment of the invention is shown. The projection device 10 comprises a wide-angle lens 100 and an optical element 300. The wide-angle lens 100 from one side 510 of an image 500 sequentially comprises a first lens group 110, a second lens group 130 and a third lens group 150. The third lens group 150 comprises an aperture stop 151. The first lens group 110 has a negative refracting power. The second lens group 130 has a positive refracting power. The third lens group 150 has a positive refracting power. The wide-angle lens 100 is located between the image 500 and the optical element 300. A focal length f1 of the first lens group 110, and a focal length fw of the wide-angle lens 100 satisfy the following conditions: $-15 \text{ mm} < f1 < -7.5 \text{ mm}$, and $0.5 < |f1/fw| < 1.5$.

The optical element 300 is a digital micro-mirror device (DMD) for example. The DMD has many micro-mirrors each corresponding to a pixel being capable of rotating to different angles to generate an ON/OFF digital signal. Thus, the to-be-displayed image is projected onto the side 510 of the image 500 by the wide-angle lens 100.

Figure 2:
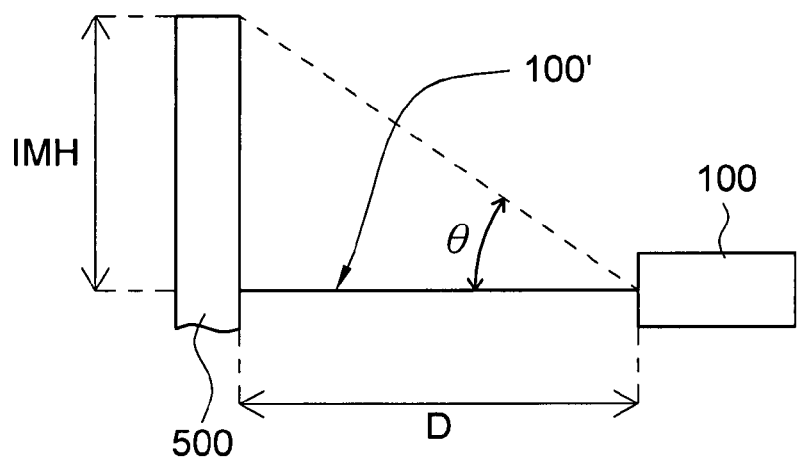
FIG. 2 shows the relationship between the image and the wide-angle lens of FIG. 1.

Referring to FIG. 2, the relationship between the image and the wide-angle lens of FIG. 1 is shown. The ratio of the image height IMH of image 500 to the projection distance D starting from the image 500 to the wide-angle lens 100 is the tangent value of the projection angle θ of the wide-angle lens 100. For the projection device 10 to achieve wide-angle function, the projection angle θ must range from 30° to 60° ($30° \leq \theta \leq 60°$). Furthermore, the wide-angle lens 100 has a back focal length (BFL) FB (illustrated in FIG. 1), wherein the back focal length FB is the distance from the last lens surface of the third lens group 150 to the optical element 300. The projection device 10 provides a light to the optical element 300 by a light source (not illustrated in the diagram). If the back focal length FB is not sufficient, the light source will interfere with the optical element 300 to generate an image on the side 510 of the image 500. The back focal length FB of the projection device 10 is preferably larger than 20 mm. As the aperture stop 151 is disposed in the third lens group 150, the wide-angle lens 100 is a non-telecentric wide-angle lens. Thus, the height of the lens far away from the side 510 of the image 500 can be further reduced, wherein the height of a lens refers to the height from the optical axis 100' of the wide-angle lens 100 to the edge of the lens.

The optical data and the disposition of each lens in the wide-angle lens 100 according to a preferred embodiment of the invention are disclosed below. However, the technology of the invention is not limited thereto.

Figure 3A:
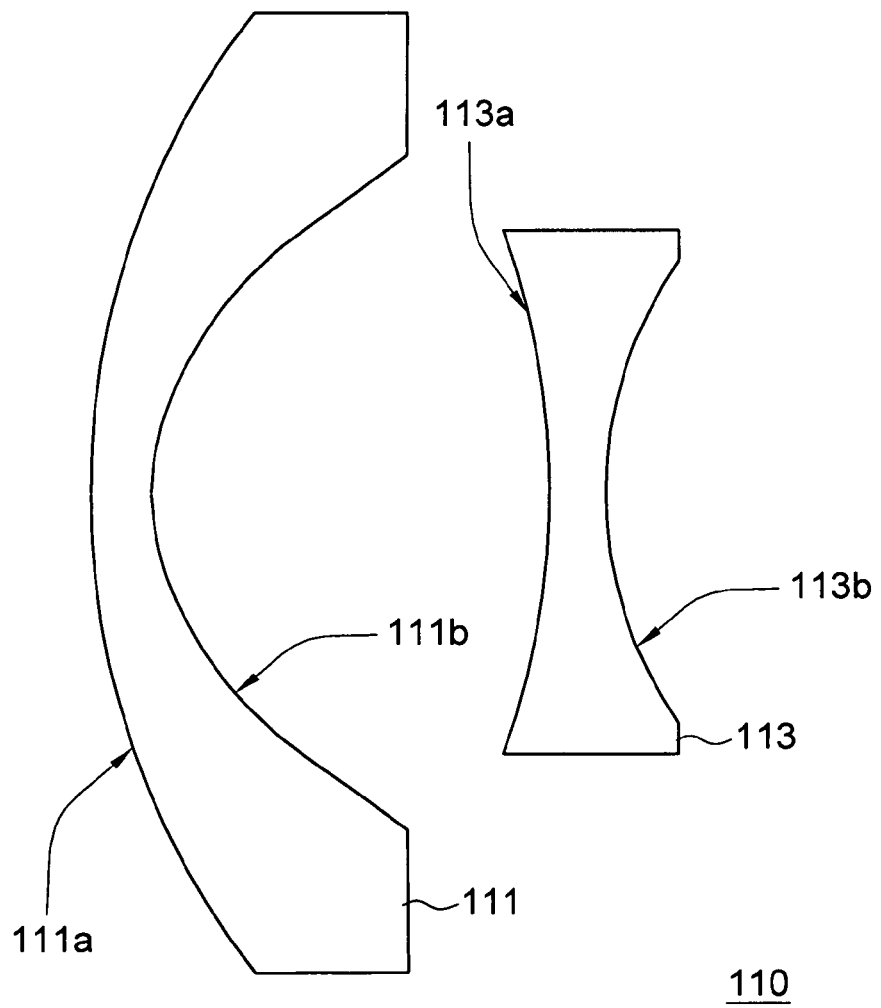
FIGS. 3A, 3B and 3C respectively show a perspective of the first, the second and the third lens group of FIG. 1.
Figure 3B:
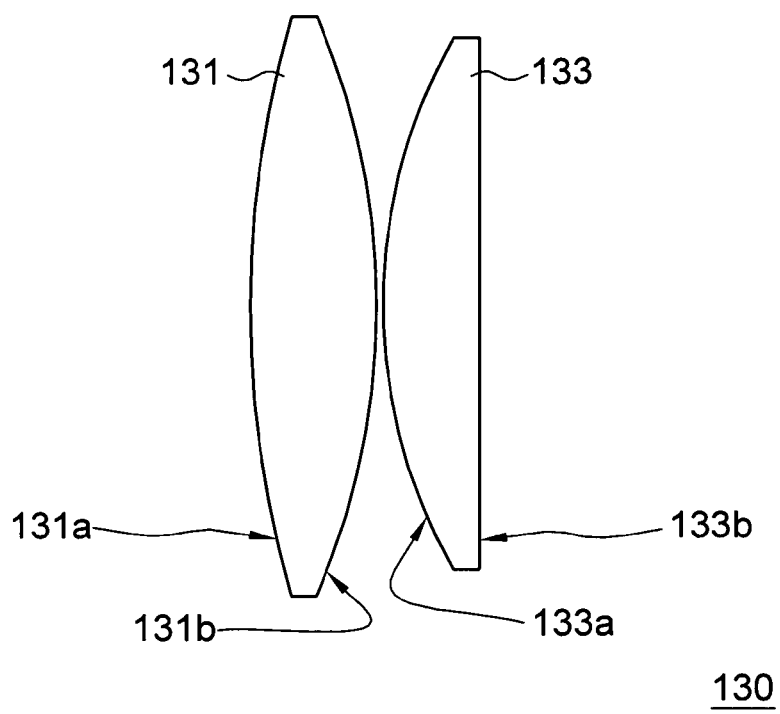
Figure 3C:
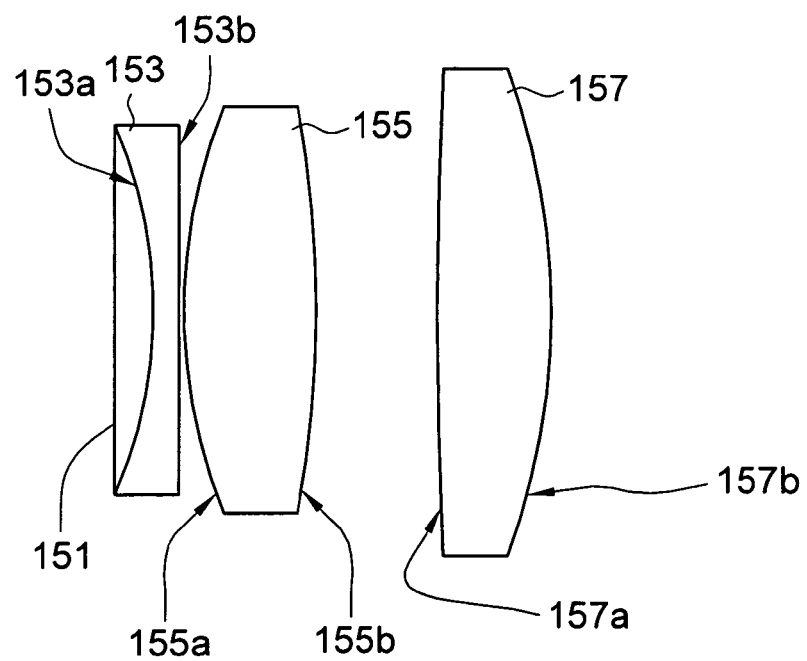

Referring to FIG. 3A and FIG. 3C. FIG. 3A shows a perspective of the first lens group of FIG. 1. FIG. 3B shows a perspective of the second lens group of FIG. 1. FIG. 3C shows a perspective of the third lens group of FIG. 1. The first lens group 110 from the side 510 of the image 500 sequentially comprises a first lens 111 and a second lens 113. The second lens group 130 from the side 510 of the image 500 sequentially comprises a third lens 131 and a fourth lens 133. The third lens group 150 from the side 510 of the image 500 sequentially comprises a fifth lens 153, a sixth lens 155 and a seventh lens 157. The aperture stop 151 is located on one side of the fifth lens 153 near the image 500. The total number of lens in the wide-angle lens 100 is substantially equal to 7. The first lens 111 and the seventh lens 157 are aspherical lenses each at least having an aspherical lens surface.

As indicated in FIG. 3A, the front side of the first lens 111 comprises an aspherical lens surface 111a, and the rear side of the first lens 111 comprises an aspherical lens surface 111b. The first lens 111 is convexed to the image 500. The first lens 111 is preferably made from plastics, Furthermore, as indicated in FIG. 3C, the front side of the seventh lens 157 comprises an aspherical lens surface 157a, and the rear side of the seventh lens 157 comprises an aspherical lens surface 157b. The seventh lens 157 is preferably made from a glass with high transparency. As the first lens group 110 and the third lens group 150 respectively correspond to the first lens 111 and the seventh lens 157 each having an aspherical surface, the projection device 10 can largely reduce the total number of lens and further enable the optical element 300 to project a large-sized image 500 in a wide angle mode.

Moreover, the second lens 113 of the first lens group 110 has a second front surface 113a and a second back surface 113b; the third lens 131 of the second lens group 130 has a third front surface 131a and a third back surface 131b; the fourth lens 133 has a fourth front surface 133a and a fourth back surface 133b; the fifth lens 153 of the third lens group 150 has a fifth front surface 153a and a fifth back surface 153b; the sixth lens 155 has a sixth front surface 155a and a sixth back surface 155b. As indicated in Table 1, the projection device 10 of the present embodiment of the invention and the projection lens 100 thereof are preferably disposed as follows:

TABLE 1

| | Curvature Radius | Interval (mm) | Refractive Index | Abbe Number |
|---|---|---|---|---|
| Image 500 | ∞ | 1250 | | |
| Aspherical Lens Surface 111a | 45.75 | 3.47 | 1.53 | 56 |
| Aspherical Lens Surface 111b | 14.96 | 22.18 | | |
| Second Front Surface 113a | −43.85 | 3 | 1.76 | 40.10 |
| Second Back Surface 113b | 24.35 | 14.04 | | |
| Third Front Surface 131a | 62.09 | 6.8 | 1.57 | 42.80 |
| Third Back Surface 131b | −43.31 | 0.15 | | |
| Fourth Front Surface 133a | 32.23 | 5.2 | 1.58 | 40.70 |
| Fourth Back Surface 133b | ∞ | 21.21 | | |
| Aperture Stop 151 | ∞ | 1.02 | | |
| Fifth Front Surface 153a | −17.41 | 0.85 | 1.85 | 23.80 |
| Fifth Back Surface 153b | ∞ | 0.15 | | |
| Sixth Front Surface 155a | 17.25 | 3.58 | 1.49 | 70.20 |
| Sixth Back Surface 155b | −30.81 | 3.34 | | |
| Seventh Front Surface 157a | 54.67 | 3 | 1.48 | 69.80 |
| Seventh Back Surface 157b | −21.78 | 20 | | |
| Eighth Front Surface 171a | ∞ | 1.05 | 1.49 | 70.20 |
| Eighth Back Surface 171b | ∞ | 3.95 | | |
| Optical Element 300 | ∞ | | | |

In Table 1, the curvature radius is the central curvature radius of each lens. If the curvature radius is infinite (∞), the corresponding surface is a plane. For example, the fourth back surface 133b is a plane. If the curvature radius is positive, the center of the curvature is located between the corresponding surface and the optical element 300. If the curvature radius is negative, the center of the curvature is located between the corresponding surface and the image 500. The interval in Table 1 is the distance from the center of a corresponding surface to the center of the next surface. For example, the distance from the apex of the aspherical lens surface 111a to the apex of the aspherical lens surface 111b is 3.47 mm, and is the central thickness of the first lens 111. Other central thickness can be obtained in the same manner.

According to the above disclosure, the second lens 113 of the projection lens 100 is a biconcave lens, and both the third lens 131 and the sixth lens 155 are a biconvex lens.

The fourth lens preferably is a convex lens convexed to the third lens 131, and can be either of a plano-convex lens and a biconvex lens. In the present embodiment of the invention, the fourth lens 133 is a plano-convex lens.

The fifth lens preferably is a concave lens concaved to the aperture stop 151, and can be either of a plano-concave lens and a biconcave lens. In the present embodiment of the invention, the fifth lens 153 is a piano-concave lens.

Furthermore, the projection device 10 further comprises a transparent plate 171 disposed between the optical element 300 and the seventh lens 157. The transparent plate 171 has an eighth front surface 171a and an eighth back surface 171b. The thickness of the transparent plate 171 is 1.05 mm.

In the part of the projection device 10 according to the above disposition, an overall length of the wide-angle lens 100 is substantially 113 mm; a focal length f1 of the first lens group 110 having a negative refracting power is −10.17 mm; a focal length f2 of the second lens group 130 having a positive refracting power is 25.53 mm; a focal length f3 of the third lens group 150 having a positive refracting power is 32.42 mm; the focal length fw of the projection device 10 is 10.20 mm. The ratio |f1/fw| of the focal length f1 to the focal length fw is substantially equal to 0.997, and the projection angle θ of the wide-angle lens 100 is substantially 47°.

According to the wide-angle lens 100 and the projection device 10 using the same disclosed in the first embodiment of the invention, when the projection distance D is 1 meter, the projection device 10 can project a 55-inch image 500. Moreover, according to the combined aberration of the color shift, the field curvature, the aberration measured by the wide-angle lens 100, the quality of the image 500 projected with the wide-angle lens 100 is within a standard range of wide-angle projection, and according to the diagram of the modulation transfer function of the wide-angle lens 100, the resolution of the wide-angle lens 100 even reaches 65%, so that the user of the projection device 10 can obtain high quality image under a shorter projection distance.

Second Embodiment

Figure 4:
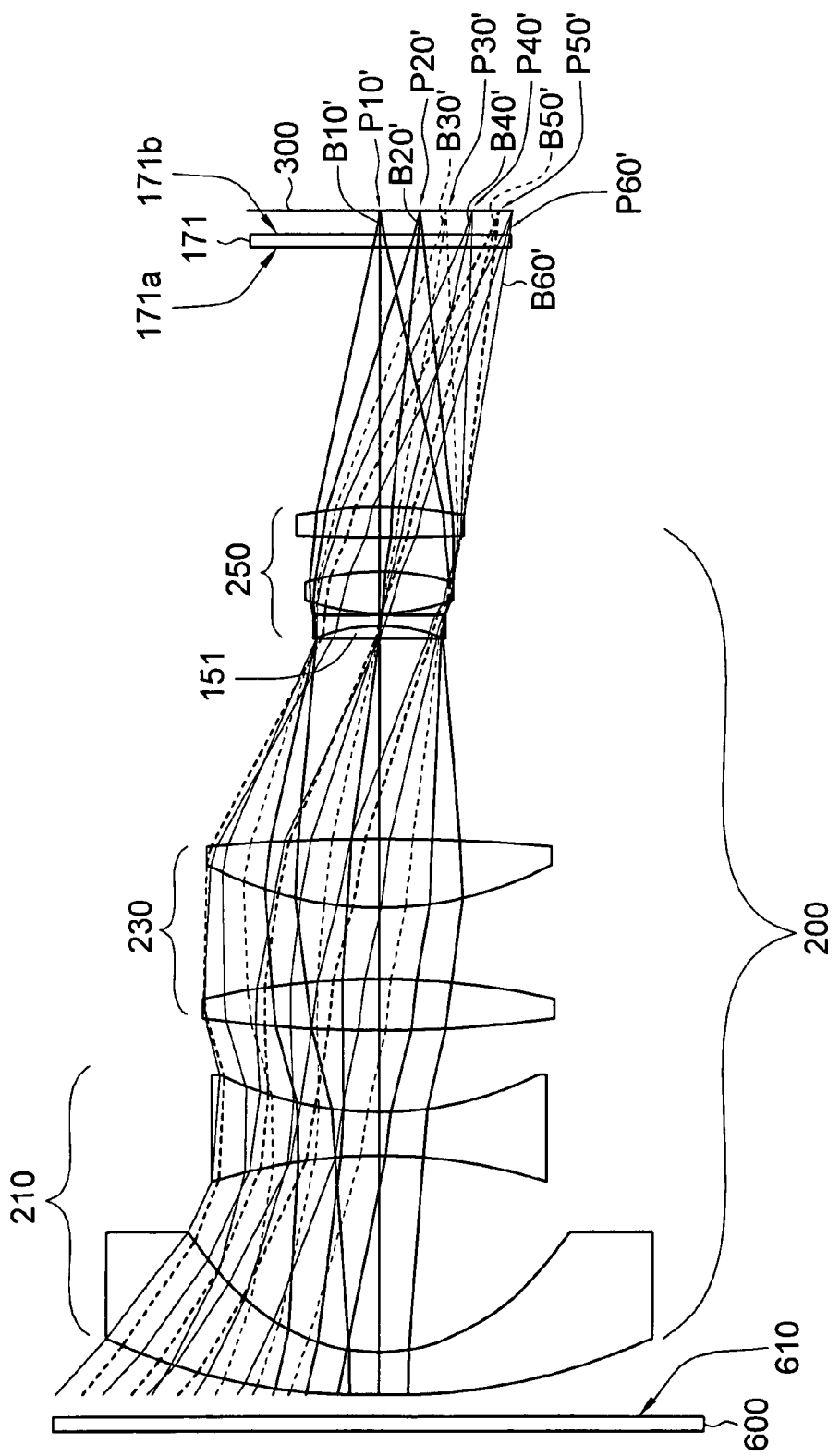
FIG. 4 shows a perspective of a projection device according to a second embodiment of the invention.

Referring to FIG. 4, a perspective of a projection device according to a second embodiment of the invention is shown. The projection device 20 comprises a wide-angle lens 200 and an optical element 300. The wide-angle lens 200 from one side 610 of an image 600 sequentially comprises a first lens group 210, a second lens group 230 and a third lens group 230.

The optical data and the disposition of each lens in the wide-angle lens according to a second embodiment of the invention are disclosed below. However, the technology of the invention is not limited thereto.

Figure 5A:
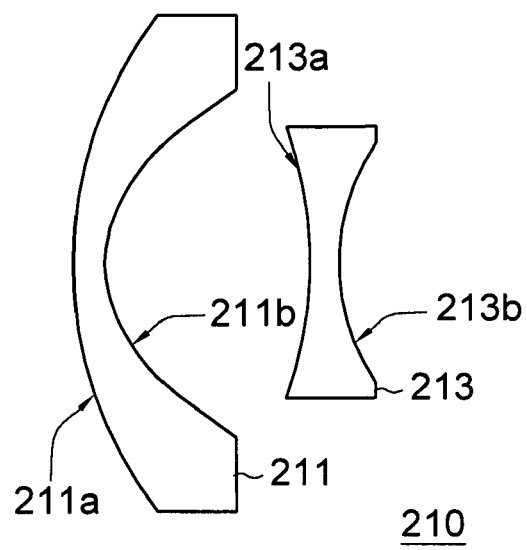
FIGS. 5A, 5B and 5C respectively show a perspective of the first, the second and the third lens group of FIG. 4.
Figure 5B:
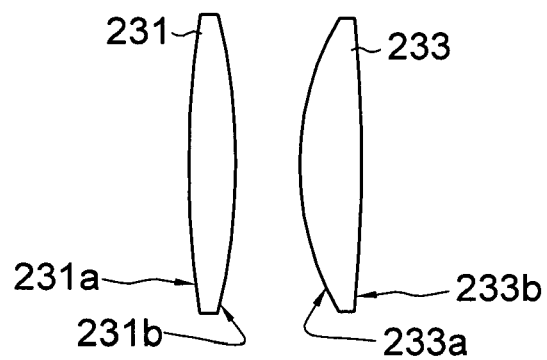
Figure 5C:
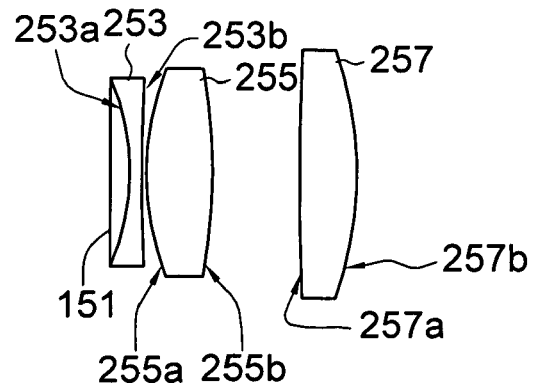

Referring to FIGS. 5A to 5C. FIG. 5A shows a perspective of the first lens group of FIG. 4. FIG. 5B shows a perspective of the second lens group of FIG. 4. FIG. 5C shows a perspective of the third lens group of FIG. 4. The first lens group 210 from the side 610 of the image 600 sequentially comprises a first lens 211 and a second lens 213. The second lens group 230 from the side 610 of the image 600 sequentially comprises a third lens 231 and a fourth lens 233. The third lens group 250 from the side 610 of the image 600 sequentially comprises a fifth lens 253, a sixth lens 255 and a seventh lens 257. The aperture stop 151 is located on one side of the fifth lens 253 near the image 600. The total number of lens in the wide-angle lens 200 is substantially equal to 7. Both the first lens 211 and the seventh lens 257 are an aspherical lens and each having at least has an aspherical lens surface.

As indicated in FIG. 5A, the front side of the first lens 211 comprises an aspherical lens surface 211a and the rear side of the first lens 211 comprises an aspherical lens surface 211b convexed to the image 600. The first lens 211 is preferably made from a glass with high transparency, As indicated in FIG. 5C, the front side of the seventh lens 257 comprises an aspherical lens surface 257a and the rear side of the seventh lens 257 comprises an aspherical lens surface 257b. The seventh lens 257 is preferably made from a glass with high transparency.

Furthermore, the second lens 213 of the first lens group 210 has a second front surface 213a and a second back surface 213b. In the second lens group 230, the third lens 231 has a third front surface 231a and a third back surface 231b, and the fourth lens 233 has a fourth front surface 233a and a fourth back surface 233b. In the third lens group 250, the fifth lens 253 has a fifth front surface 253a and a fifth back surface 253b, and the sixth lens 255 has a sixth front surface 255a and a sixth back surface 255b. As indicated in Table 2, the projection device 20 of the present embodiment of the invention and the projection lens 200 thereof are preferably disposed as follows:

TABLE 2

|  | Curvature Radius | Interval (mm) | Refractive Index | Abbe Number |
|---|---|---|---|---|
| Image 600 | ∞ | 1000 | | |
| Aspherical Lens Surface 211a | 62.23 | 3.6 | 1.53 | 56 |
| Aspherical Lens Surface 211b | 14.2 | 16.58 | | |
| Second Front Surface 213a | −43.23 | 3.69 | 1.74 | 44.80 |
| Second Back Surface 213b | 28.43 | 6.85 | | |
| Third Front Surface 231a | 99.69 | 4.35 | 1.83 | 37.20 |
| Third Back Surface 231b | −64.94 | 6.02 | | |
| Fourth Front Surface 233a | 28.57 | 5.8 | 1.69 | 50.80 |
| Fourth Back Surface 233b | −166 | 17.07 | | |
| Aperture Stop 151 | ∞ | 1 | | |
| Fifth Front Surface 253a | −14.85 | 0.9 | 1.78 | 26.30 |
| Fifth Back Surface 253b | 204.10 | 0.2 | | |
| Sixth Front Surface 255a | 16.77 | 3.5 | 1.49 | 70.20 |
| Sixth Back Surface 255b | −21.79 | 2.85 | | |
| Seventh Front Surface 257a | 62.89 | 2.58 | 1.56 | 57.10 |
| Seventh Back Surface 257b | −28.4 | 20 | | |
| Eighth Front Surface 171a | ∞ | 1.05 | 1.49 | 70.20 |
| Eighth Back Surface 171b | ∞ | 3.98 | | |
| Optical Element 300 | ∞ | | | |

The definition of the parameters in Table 2 is the same as that in Table 1. As indicated in Table 2, the second lens 213 is a biconcave lens, the third lens 231 is a biconvex lens, and the sixth lens 255 is a biconvex lens. In the present embodiment of the invention, the fourth lens 233 is a biconvex lens, and the fifth lens 253 is a biconcave lens.

On the part of the projection device 20 according to the above disposition, an overall length of the wide-angle lens 200 is substantially 100 mm; a focal length f1' of the first lens group 210 having a negative refracting power is −10.61 mm; a focal length f2' of the second lens group 230 having a positive refracting power is 22.30 mm; a focal length f3' of the third lens group 250 having a positive refracting power is 34.04 mm; a focal length fw' of the projection device 20 is 12.2 mm. The ratio |f1'/fw'| of the focal length f1' vs. the focal length fw' is substantially equal to 0.870, and the projection angle θ' of the wide-angle lens 200 is substantially 42°.

According to the wide-angle lens 200 and the projection device using the same 20 disclosed in the first embodiment of the invention, when the projection distance D' is 1 meter, the projection device 20 can project a 45-inch image 600. More-over, according to the combined aberration of the color shift, the field curvature, the aberration measured by the wide-angle lens 200, the quality of the image 600 projected with the wide-angle lens 200 is within a standard range of wide-angle projection, and according to the diagram of the modulation transfer function of the wide-angle lens 200, the resolution of the wide-angle lens 200 even reaches 65%, so that the user of the projection device 20 can obtain high quality image with a shorter projection distance.

According to the wide-angle lens and the projection device using the same disclosed in the above embodiments of the invention, the first lens group, the second lens group and the third lens group comprise lenses with different optical characteristics. However, anyone who is skilled in the technology of the invention will understand that the invention is not limited thereto. Any designs of wide-angle lens having a first lens group, a second lens group and a third lens group which comprise seven lenses in total and respectively have a negative, a positive and a negative positive refracting power are within the scope of protection of the invention.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens disposed in a projection device, wherein the wide-angle lens is a non-telecentric wide-angle lens, and the wide-angle lens from an image side sequentially comprises:

a first lens group having a negative refracting power;

a second lens group having a positive refracting power; and a third lens group comprising an aperture stop and having a positive refracting power;

wherein, a focal length f1 of the first lens group and a focal length fw of the wide-angle lens satisfy the following conditions:

−15 mm<f1<−7.5 mm; and 0.5<|f1/fw|<1.5.

2. The wide-angle lens according to claim 1, wherein a ratio of an image height of the image to a projection distance starting from the image to the wide-angle lens substantially is the tangent value of a projection angle θ of the wide-angle lens, and the projection angle θ satisfies the following condition:

30°≦θ≦60°.

3. The wide-angle lens according to claim 1, wherein a back focal length (BFL) of the wide-angle lens is larger than 20 mm.

4. The wide-angle lens according to claim 1, wherein the total number of lenses in the wide-angle lens is equal to 7.

5. The wide-angle lens according to claim 4, wherein the first lens group from the image side sequentially comprises a first lens and a second lens, the second lens group from the image side sequentially comprises a third lens and a fourth lens, the third lens group from the image side sequentially comprises a fifth lens, a sixth lens and a seventh lens, and the aperture stop is located on one side of the fifth lens near the image.

6. The wide-angle lens according to claim 5, wherein in the first lens group, the first lens is an aspherical lens, and the second lens is a biconcave lens.

7. The wide-angle lens according to claim 5, wherein in the third lens group, the fifth lens is a concave lens, the fifth lens has a first concave surface concaved to the aperture stop, the sixth lens is a biconvex lens, and the seventh lens is an aspherical lens.

8. A projection device, comprising:
a wide-angle lens from an image side sequentially comprising:
a first lens group having a negative refracting power;
a second lens group having a positive refracting power; and
a third lens group comprising an aperture stop and having a positive refracting power; and
an optical element, wherein the wide-angle lens is located between the image and the optical element;
wherein the wide-angle lens is a non-telecentric wide-angle lens, and a focal length f1 of the first lens group and a focal length fw of the wide-angle lens satisfy the following conditions:
−15 mm<f1<−7.5 mm; and
0.5<|f1/fw|<1.5.

9. The projection device according to claim 8, wherein the optical element is a digital micro-mirror device (DMD), and the wide-angle lens is a non-telecentric wide-angle lens.

10. The projection device according to claim 8, wherein a ratio of an image height of the image to a projection distance starting from the image to the wide-angle lens substantially is the tangent value of a projection angle θ of the wide-angle lens, and the projection angle θ satisfies the following condition:
30°≦θ≦60°.

11. The projection device according to claim 8, wherein the total number of lenses in the wide-angle lens is equal to 7.

12. The projection device according to claim 11, wherein the first lens group from the image side sequentially comprises a first lens and a second lens, the second lens group from the image side sequentially comprises a third lens and a fourth lens, the third lens group from the image side sequentially comprises a fifth lens, a sixth lens and a seventh lens, and the aperture stop is located on one side of the fifth lens near the image.

13. The projection device according to claim 12, wherein in the first lens group, the first lens is an aspherical lens, and the second lens is a biconcave lens.

14. The projection device according to claim 12, wherein in the third lens group, the fifth lens is a concave lens, the fifth lens has a first concave surface concaved to the aperture stop, the sixth lens is a biconvex lens, and the seventh lens is an aspherical lens.

* * * * *

UNITED STATES PATENT AND TRADEMARK OFFICE
CERTIFICATE OF CORRECTION

PATENT NO. : 7,800,828 B2
APPLICATION NO. : 12/314536
DATED : September 21, 2010
INVENTOR(S) : Ming-Kuen Lin It is certified that error appears in the above-identified patent and that said Letters Patent is hereby corrected as shown below:

Title page, item [73] Assignee should be: Qisda Corporation

Signed and Sealed this
Twenty-eighth Day of December, 2010

David J. Kappos
*Director of the United States Patent and Trademark Office*